United States Patent
Ohta et al.

[11] 3,780,420
[45] Dec. 25, 1973

[54] METHOD OF FILLET WELDING

[75] Inventors: Masachika Ohta; Toshio Wakameda, both of Otahara, Japan

[73] Assignee: Kawada Kogyo Kabushiki Kaisha, Toyama-ken, Japan

[22] Filed: Apr. 21, 1971

[21] Appl. No.: 136,066

[30] Foreign Application Priority Data
June 19, 1970 Japan.................................. 45/53848

[52] U.S. Cl.................. 29/471.1, 29/200 P, 29/484, 29/493, 228/4, 228/44
[51] Int. Cl............................................ B23k 31/02
[58] Field of Search ...................... 228/4, 25, 41, 44, 228/45; 29/470, 471.1, 484, 200 J, 200 P, 29/252, 493; 219/124, 125, 130, 137

[56] References Cited
UNITED STATES PATENTS
3,444,352   5/1969   Ogden et al. ........................ 219/125

*Primary Examiner*—Robert D. Baldwin
*Assistant Examiner*—Robert J. Craig
*Attorney*—Steinberg & Blake

[57] ABSTRACT

A method and apparatus for fillet welding in which a pair of welding rod holders are provided on a feeding device so as to press welding rods on both parts to be welded and on both sides of one of them.

10 Claims, 4 Drawing Figures

METHOD OF FILLET WELDING

The present invention relates to a welding method having particular application in constructing steel bridge girders and the like, where stiffeners or rib plates are to be welded to web plates or flange plates by way of fillet welding.

In one method of fillet welding of this type it has been conventional to use a single sided welder wherein welding rod holders are positioned to one side of a stiffener and the welding is effected by alternate current metal arc welding whilst in another method a welder of gravity type has been used wherein the welding rods move in an inclined plane under their own weight.

Preferably in fillet welding using such automatic welders, the welding rods should be pressed constantly on a face of the weld with a suitable force so that the fillet will not deviate from the predetermined part, the fillet should not be unnecessarily large, and the frequency of changing of welding rods should be as low as possible.

However, it is difficult to minimize the frequency of welding rod changes. It might be achieved by elongating the welding rods. However, since welding rods, as aforementioned, must be pressed constantly on the face of the weld with a proper force, the longer the rods the greater the force required. Furthermore, elongate welding rods tend to warp due to the rise in temperature caused by increased resistance and hence current. Production of proper beads is not achieved. Therefore the welding rods have to be increased in cross section in proportion to the elongation. However, when the welding rods having a large diameter are used, fillets become unnecessarily large, thereby causing waste of welding and large warps in the weld.

Extremely long welding rods are not used in the prior welders of the type described above for the reasons indicated, and frequent changes of welding rod have to be accepted. Further, the holders for the welding rods are positioned relative to parts to be welded by the single side fixing type or gravity type welder. Also the weld length is shorter than the length of the welding rod while the size of the fillet is larger.

The present invention aims to overcome such drawbacks. It is an object of the present invention to extend the weld length of a welding rod without creating unnecessarily large fillets while using welding rods similar in width and length to those conventionally used.

According to the present invention there is provided a method of automatic fillet welding two parts in which a fillet weld is effected simultaneously on both sides of one part by welding rods carried on a welder movable on one of the parts to be welded at a low speed and pressed against the parts to be welded on both sides of one of the parts.

In order that the invention may be well understood there will now be described some embodiments thereof, given by way of example only, reference being had to the accompanying drawings, in which.

Figure 1:
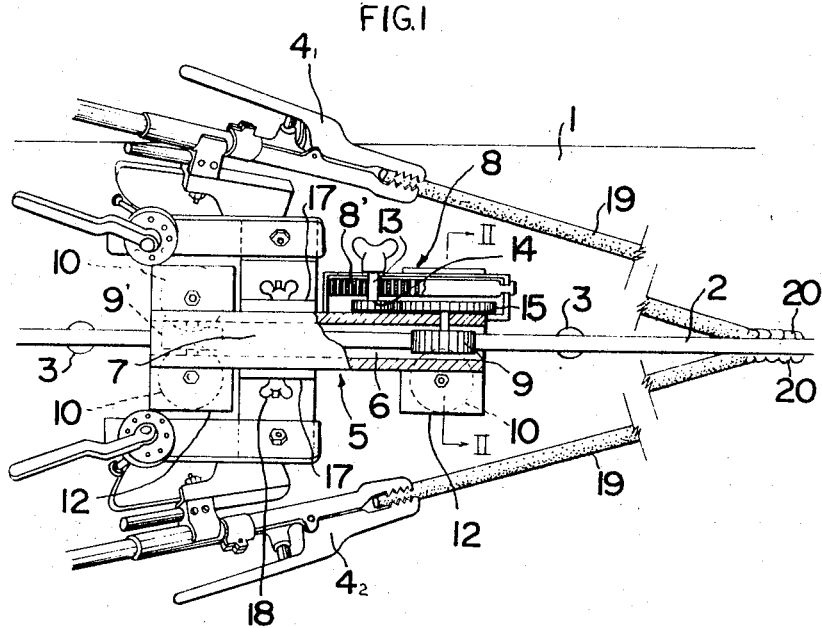
FIG. 1 is a plan view showing one embodiment of the present invention.

Reference numeral 1 denotes a web plate or a flange plate and reference 2 a stiffener or a rib plate. The stiffener 2 is tack welded to the web plate 1 as at points such as 3. An automatic feeding device 5 provided with welding rod holders $4_1$ and $4_2$ to both sides thereof is mounted on the upper free margin of stiffener 2. The automatic feeding device 5 comprises a frame 7 U-shaped in cross section forming a groove 6 into which the margin of the stiffener 2 can be inserted fully. A power source 8 is mounted on the frame which has wheels 9, 9' and 10. The wheels 9, 9' on the inside of the frame 7 are arranged with their axes transverse to the groove so as to run on the free edge of stiffener 2, the wheel 9 being the driving wheel coupled to power source unit 8. Adjacent the mouth of the groove 6 are members 12 carrying guiding wheels 10 whose axes are parallel to the groove walls, wheels 10 engaging the faces of the stiffener.

Figure 2:
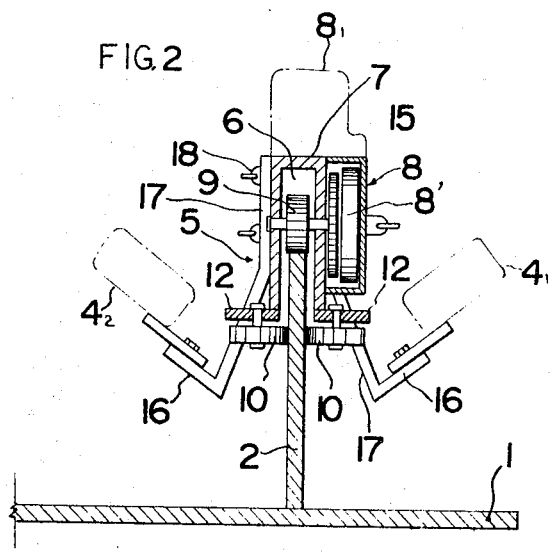
FIG. 2 is a section along the line II—II in FIG. 1.

The power source 8 is shown as driven by a coiled main-spring 8', power being transmitted to the driving wheel 9 by a gear 14 on shaft 13 of the spring 8' and a speed reduction gear 15 fixed to the end of the shaft of the wheel 9. Power source 8 may be a small motor instead of a helical mainspring. In FIG. 2, a small motor is shown by chain line $8_1$ on the upper portion of the frame 7. In the case where a small motor is used, the gear 14 and the speed reduction gear 15 mentioned above are required to transmit the power to the driving wheel 9.

Rod holder support plates 17 each having its lower end 16 upwardly and outwardly inclined as viewed in FIG. 2 are provided on the frame and are adjustably positioned relative to the frame by means of a wing nut 18. The welding rod holders $4_1$ and $4_2$ are mounted on the lower ends 16 and position welding rods 19 relative to the deposited weld 20.

Figure 3:
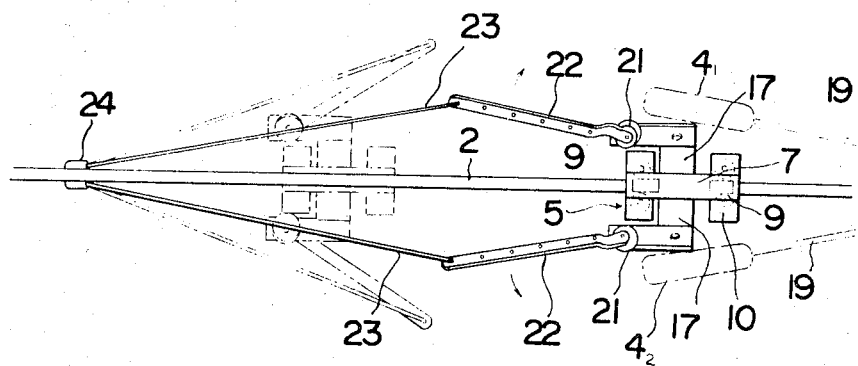
FIG. 3 is a plan view showing another embodiment of the present invention.

FIG. 3 illustrates an embodiment wherein the automatic feeding device 5 shown in the foregoing embodiment is moved without the power source provided to the frame 7. The frame 7, in this embodiment, is provided with the wheels 9 and 9' engaging the free edge of the stiffener, wheels 10 engaging the faces of the stiffener and holder support plate 17 being constructed as in the foregoing embodiment. Spiral springs 21 urge the rear ends of the holders $4_1$ and $4_2$ in a direction to constantly press the welding rods 19 against the parts to be welded, the angle of the rods to the work becoming less acute as the welding rods 19 shorten due to melting, and the springs 21 unwinding. The spiral springs bear against arms 22 coupled to wires 23 and the arms rotate proportionately to the unwinding of the springs. Wires 23 are anchored to the stiffener 2 by means of a clamp 24 such as of a magnet type. Consequently, as the welding operation proceeds, as shown in the drawings, the arms 22 pivot on the frame 7, draw the frame along the stiffener by virtue of being anchored to wires 23 and holders $4_1$ and $4_2$ are urged against the work, increasing their angle relative to the work as the frame advances.

Figure 4:
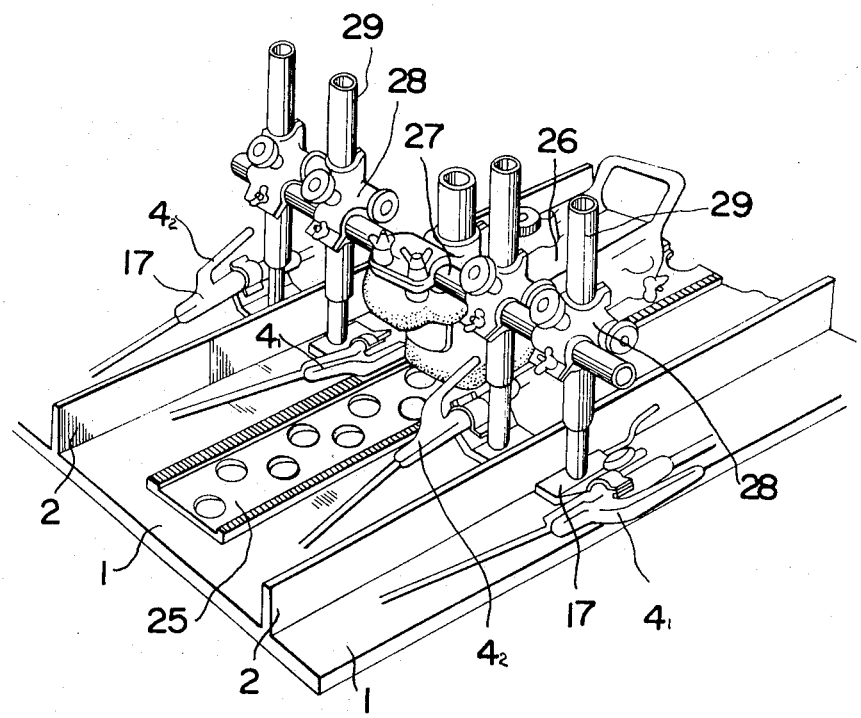
FIG. 4 is a perspective view showing a still further embodiment of the invention.

FIG. 4 shows another embodiment of the present invention wherein a plurality of stiffeners 2 on a web plate 1 can be welded simultaneously. A rail plate 25 is arranged on the web plate 1 between a plurality of stiffeners 2, and a transfer device 26 is movable thereupon at a low speed. A horizontal arm 27 projecting in the lateral direction is fixed to the rear end of the transfer device 26, longitudinal arms 29 being so supported on arm 27 by holders 28 as to be movable in the vertical and horizontal directions, holder support plates 17 carrying rod holders $4_1$ $4_2$ being arranged at the lower ends of arms 29 on both sides of each stiffener 2.

The apparatus shown in FIGS. 1 to 4 is so contrived that the holders $4_1$ and $4_2$ can move a predetermined distance at a low speed along the stiffeners 2 by the rotation of a power source 8 such as the coil springs, motor or arms 22 while the welding is carried out, whereby the melting part of the rods at the welding point are drawn rearwardly at the same time as the weld proceeds. The weld is elongated thereby providing a length of fillet having a predetermined size which is not unnecessarily large and decreasing the welding warps due to local excess fillet. Further, it is possible to melt the welding rods to give a fillet longer than the original length of the rods, so that the operation is economical and requires less rod changing. The comparative data of examples of the present invention and conventional welders of the single side fixing type is as follows. When using a welding rod having a diameter of 5 mm and a length of 700 mm, an effective welding length of 600 mm and leg length of 7 – 8 mm respectively was achieved using the conventional welder of a single side fixing type, while a weld length of 800 mm and leg length of 5 mm, was achieved in the transfer type welder of the present invention.

Further, in accordance with the welding method of the present invention, as the novel welding apparatus is provided with the transfer device to move the welding rods, it is possible to provide two welding rod holders $4_1$ and $4_2$ on the transfer device in order to weld both surfaces of the stiffeners 2, so that simultaneous welding of both surfaces thereof is possible, welding warps are decreased and the remarkable development of operational efficiency is obtained. Particularly, in the embodiment illustrated in FIG. 4, both surfaces of more than one stiffener can be welded at one time and the operational efficiency thereof is extremely good.

In the embodiments illustrated in FIGS. 1 to 3, since the frame 7 moves on the free edge of the stiffener 2, the movement is not ill-affected by flux dispersing at the time of welding point.

Thus, it will be seen that with the method of the invention the stiffener plate 2 extends perpendicularly from the wall 1 to define at its intersection with the wall 1 the elongated corners at the opposite sides of the edge of plate 2 which engages the wall 1 which are to receive, respectively, the fillet welds simultaneously. The pair of welding rods 19 are positioned with their tips respectively located at these corners. With the embodiments of FIGS. 1–3 the pair of welding rods are swingably carried by a carriage 5 which rides along the free edge of the stiffener plate 2 which is distant from the wall 1, the carriage 5 being driven by the power source 8 in the embodiment of FIGS. 1 and 2 while with the embodiment of FIG. 3 the wires 23 are anchored by way of the magnets 24 to the assembly of the wall 1 and the stiffening plate 2, and while the springs 21 urge the tips of the rods 19 inwardly toward the pair of corners which simultaneously receive the fillet welds the levers 22 turn so as to swing the wires 23 outwardly while pulling the carriage 5 from the solid toward the dot-dash line position shown in FIG. 3, so that with the embodiment of FIG. 3 the force of the springs 21 serve to urge the rods inwardly toward the corners which are to receive the welds and simultaneously advance the carriage 5 along the stiffener plate 2.

With the embodiment of FIG. 4 a pair of parallel stiffeners are each simutaneously welded to the wall 1 with a pair of welding rods arranged and acted upon as described above, but in this case the drive for the two pairs of welding rods is in the form of a commmon drive which in the illustrated example is situated between the pair of stiffener plates 2.

We claim:

1. In a method for welding to a wall a stiffener plate which extends perpendicularly from the wall and defines at its intersection with the latter a pair of elongated corners extending along opposite sides of that edge of said stiffener plate which engages the wall, the steps of situating simultaneously at said corners the tips of a pair of welding rods, respectively, while arranging said welding rods substantially symmetrically with respect to each other on opposite sides of said stiffener plate inclined outwardly from said corners and respectively extending therefrom longitudinally along opposite sides of said stiffener plate, and moving, during deposition of a pair of fillet welds simultaneously in said corners, said pair of rods longitudinally of said stiffening plate in a direction extending generally from the tips of the rods toward the part of the stiffener plate which is situated between said rods while simultaneously swinging said rods inwardly toward each other to maintain their tips at said corners during consuming of said rods as the deposition of the fillet welds proceeds.

2. In a method as recited in claim 1 and including the steps of mounting a carriage on a free edge of said stiffener plate which is distant from said wall to ride along said free edge of said stiffener plate, while supporting said rods from said carriage and advancing along said stiffener plate to move the rods longitudinally of the stiffener plate during simultaneous deposition of said fillet welds.

3. In a method as recited in claim 2 and including the step of driving the carriage along said stiffener plate.

4. In a method as recited in claim 3 and including the step of driving the carriage with a power source carried by the carriage.

5. In a method as recited in claim 3 and including the step of urging the rods at their tips inwardly toward said corners with a pair of springs.

6. In a method as recited in claim 5 and including the steps of turning a pair of levers with said springs while pivotally connecting to free ends of said levers a pair of wires which are anchored to the assembly of said stiffener plate and wall at ends of said wires distant from said levers so that while said levers turn they pull the carriage along said stiffener plate to advance said rods during deposition of the pair of fillet welds.

7. In a method as recited in claim 6 and wherein the ends of the wires distant from said levers are magnetically anchored to said assembly.

8. In a method as recited in claim 1 and wherein a plurality of said stiffener plates extend parallel to each other and are perpendicularly arranged with respect to said wall with a pair of said rods being situated at each side of each stiffener plate, and simultaneously advancing all of said pairs of rods longitudinally of said stiffener plates for simultaneously welding the latter to said wall.

9. In a method as recited in claim 8 and including the steps of supporting all of said pairs of rods from a common supporting assembly, and driving the latter assembly for advancing the pairs of rods simultaneously along said stiffener plates.

10. In a method as recited in claim 9 and including the step of driving the supporting assembly from a single driving source situated between a pair of said stiffener plates.

* * * * *